(12) United States Patent
Lee

(10) Patent No.: US 8,351,425 B2
(45) Date of Patent: Jan. 8, 2013

(54) COMMUNICATION RELAY SYSTEM, SERVER, AND METHOD FOR SAME

(76) Inventor: Hyuck Lee, Seoul (KR)

( * ) Notice: Subject to any disclaimer, the term of this patent is extended or adjusted under 35 U.S.C. 154(b) by 0 days.

(21) Appl. No.: 13/123,003

(22) PCT Filed: Oct. 22, 2009

(86) PCT No.: PCT/KR2009/006114
§ 371 (c)(1),
(2), (4) Date: Apr. 7, 2011

(87) PCT Pub. No.: WO2010/047540
PCT Pub. Date: Apr. 29, 2010

(65) Prior Publication Data
US 2011/0261748 A1    Oct. 27, 2011

(30) Foreign Application Priority Data

Oct. 24, 2008 (KR) .................. 10-2008-0104771
Oct. 21, 2009 (KR) .................. 10-2009-0100161

(51) Int. Cl.
| H04L 12/66 | (2006.01) |
| H04J 3/22  | (2006.01) |
| H04J 3/24  | (2006.01) |
| H04J 3/00  | (2006.01) |
| H04W 4/00  | (2009.01) |

(52) U.S. Cl. .................. 370/356; 370/328; 370/466
(58) Field of Classification Search .................. None
See application file for complete search history.

(56) References Cited

U.S. PATENT DOCUMENTS 7,890,086 B2 * 2/2011 Lee et al. .................. 455/413
2004/0078475 A1   4/2004 Camenisch 2006/0047572 A1 *  3/2006 Moore et al. .................. 705/14
2006/0274896 A1   12/2006 Livesay
2008/0096592 A1 *  4/2008 Waytena et al. .............. 455/466
2008/0096594 A1 *  4/2008 Vinding .................. 455/466
2009/0018817 A1 *  1/2009 Sang et al. .................. 704/9

FOREIGN PATENT DOCUMENTS

WO    2005-034424 A1    4/2005

OTHER PUBLICATIONS

S. Kellomaki, R. Aarts, M. Aparicio, C.Canales, P. Davis, R. Lockhart, G. Lorenzo, A. Navarro, S. Ochoa, D. Perez and D. Ser, Liberty Content SMS and MMS Specification, Version 1.0, retrieved from The Internet Archive, www.archive.org, as archived on Jul. 23, 2007, pp. 1-37.*
International Search Report (PCT/KR2009/006114) dated Jun. 17, 2010.

* cited by examiner

*Primary Examiner* — John Blanton
*Assistant Examiner* — Christopher Crutchfield
(74) *Attorney, Agent, or Firm* — Maxon IP LLC.; Justin H. Kim

(57) ABSTRACT

The present invention relates to the formation by a communication relay server of a communication pathway between a terminal and a service provider server. It relates to a communication relay system, server and method for same, wherein, when a terminal accesses a service provider server, the communication relay server uses virtual information such as path ID, etc., to form a communication pathway so that terminal identification information such as telephone number, etc., may not be directly exposed, and the communication pathway that is formed between the terminal and the service provider server may also be changed to a communication pathway that is formed between another terminal and the service provider server.

13 Claims, 2 Drawing Sheets

[FIG. 1]
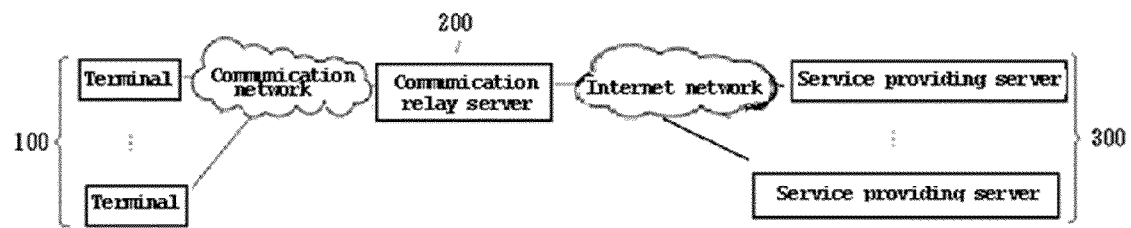
[FIG. 2]
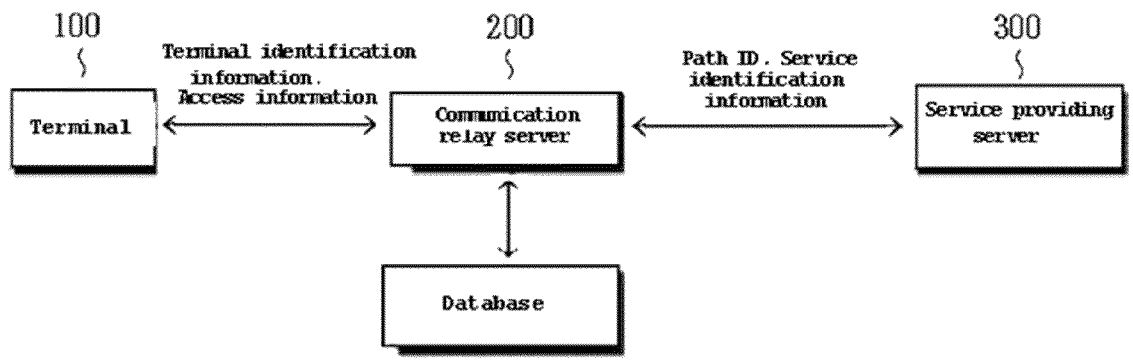

[FIG. 3]
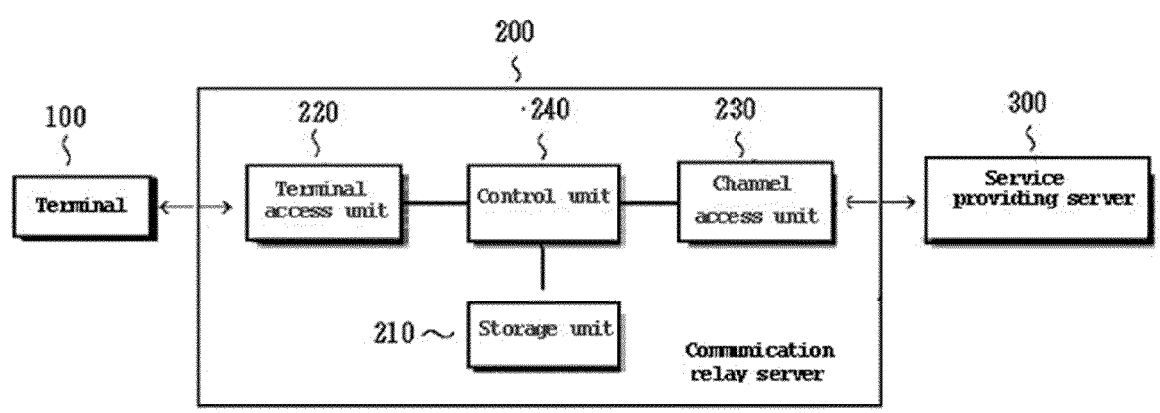

COMMUNICATION RELAY SYSTEM, SERVER, AND METHOD FOR SAME

CROSS-REFERENCES TO RELATED APPLICATIONS

The present application claims priority to International Application PCT/KR2009/006114, with an International Filing Date of Oct. 22, 2009, which claims the benefits of Korean Patent Application No. 10-2008-0104771 filed in the Korean Intellectual Property Office on Oct. 24, 2008 and Korean Patent Application No. 10-2008-0100161 filed in the Korean Intellectual Property Office on Oct. 21, 2009, the entire contents of which are incorporated herein by reference.

BACKGROUND OF THE INVENTION

1. Field of the Invention

The present invention relates to a communication relay system, server, and method and, more particularly, to a communication relay system, server, and method, wherein a communication path is formed based on virtual information, such as a path ID corresponding to terminal identification information provided by a terminal, without directly providing the terminal identification information to a service providing server in order for the terminal identification information not to be exposed to the service providing server, in a process of the communication relay server forming the communication path between the terminal and the service providing server.

2. Background of the Related Art

Today, a variety of communication networks are connected to Internet networks through gateways, thus becoming able to provide various services. In particular, with the digitalization of public telecommunication networks (e.g., a PSTN) and the rapid development of the Internet, Internet phone services, such as VoIP service, web to web, web to phone, and phone to phone, are being widely used.

The Internet phone service was first provided by VocalTec Communications Ltd. (Israel) on February, 1995 and rapidly spread worldwide. In the Internet, phone service, the Internet, and the PSTN network are interconnected by an Internet phone gateway server, enabling the Internet phone service method.

From among them, in the phone to web service, a specific number is allocated to a service providing server, and Internet service is provided to a terminal through the allocated, number. The phone to web service, however, is problematic in limited number resources and expenses because numbers have to be allocated to respective services in order to utilize various services.

Furthermore, since terminal identification information, such as the telephone number of a terminal, is directly exposed to the service providing server, a vulnerable security problem, is generated. There is an increasing possibility that the service providing server may collect and misappropriate telephone numbers for malicious purposes.

SUMMARY OF THE INVENTION

Accordingly, the present invention has been made in view of the above problems occurring in the prior art, and it is an object of the present invention to provide a communication relay system, server, and method, which is capable of improving security by preventing terminal identification information of a terminal from being exposed when the terminal accesses a service providing server.

Furthermore, it is another object of the present invention to provide a communication relay system, server, and method, wherein pieces of access information are stored in the communication relay server in order to eliminate inconvenience that the access information must be allocated to each of services provided by service providing servers, more various services than the number of pieces of access information stored in the communication relay server are provided, and each terminal is selectively provided with services by the number of pieces of access information stored in the communication relay server.

Furthermore, it is yet another object of the present invention to increase user convenience by changing a communication relay path to another terminal during communication relay through a communication relay server between a terminal and a service providing server.

To achieve the above objects, a communication relay system according to the present invention includes at least one terminal for attempting communication over a communication network using access information and transmitting terminal identification information together with the access information; at least one service providing server for providing service through a communication path set up over an Internet network; and a communication relay server for setting up the communication path between the terminal and the service providing server. Here, the communication relay server can access a database storing records, including pieces of terminal identification information, access information, and service identification information and path IDs, the communication relay server searches for a record including the terminal identification information and the access information, when the terminal attempts communication while transmitting the terminal identification information and the access information to the communication relay server, and the communication relay server selects a service providing server, corresponding to the service identification information and the path ID included in the retrieved record, and sets up a communication path between the selected service providing server and the terminal attempting the communication. Accordingly, the terminal identification information of the terminal is protected because the terminal identification information is not provided to the service providing server, and types of services are not limited to a number of pieces of access information provided by the communication relay server because the terminal identification information and the access information are paired and service to be used by the terminal is checked.

Furthermore, in the communication relay system of the present invention, when the service providing server attempts communication while transmitting service identification information and a path ID to the communication relay server, the communication relay server may search for a record including the service identification information and the path ID, select a terminal corresponding to terminal identification information and access information included in the retrieved record, and set up a communication path between the selected terminal and the service providing server attempting communication.

Furthermore, in the communication relay system of the present invention, the terminal may be any one of a telephone, a portable phone, and an Internet phone, the terminal identification information may be a telephone number of the terminal, and the access information may be a telephone number and a WINC number for attempting the communication with the communication relay server.

Furthermore, in the communication relay system of the present invention, the terminal may be a communication terminal capable of using a messenger, the terminal identification information may be a messenger ID used in the terminal, and the access information may be a messenger ID for attempting the communication with the communication relay server.

Furthermore, a communication relay server of the present invention may include a storage unit for including a database, storing records including pieces of terminal identification information, access information, and service identification information and path ID; a terminal access unit for accessing a terminal; a channel access unit for accessing a service providing server; and a control unit for, when communication using terminal identification information and access information is attempted by the terminal, setting up a communication path to the service providing server based on service identification information and a path ID corresponding to the terminal identification information and the access information, and when communication service identification information and a path ID is requested by the service providing server, setting up an access path to the terminal based on terminal identification information and access information corresponding to the service identification information and the path ID.

Furthermore, a communication relay method of the present invention may include a step A1 of a communication relay server capable of accessing a database storing records, including pieces of terminal identification information, access information, and service identification information, and path IDs, checking terminal identification information and access information, received from a terminal attempting communication, based on the access information managed by the communication relay server; a step A2 of the communication relay server searching for the database for a record including the terminal identification information and the access information checked at step A1; a step A3 of the communication relay server determining a service providing server to which a communication path will be set up based on the service identification information of the record retrieved at step A2; and a step A4 of the communication relay server setting up the communication path between the terminal and the service providing server by transmitting the service identification information and the path ID, corresponding to the record retrieved at step A2, to the service providing server determined at step A3.

Furthermore, a communication relay method of the present invention may include a step B1 of a communication relay server capable of accessing a database storing records, including pieces of terminal identification information, access information, and service identification information, and path IDs, receiving service identification information and a path ID from a service providing server attempting communication with the communication relay server; a step B2 of the communication relay server searching the database for a record, including the service identification information and the path ID received at step B1; a step B3 of the communication relay server determining a terminal to which a communication path will, be set up based on the terminal identification information corresponding to the record retrieved at step B2; and a step B4 of the communication relay server setting up the communication path between the service providing server and the terminal by transmitting the terminal identification information and the access information, corresponding to the record retrieved at step B2, to the terminal determined at step B3.

Furthermore, the communication relay method of the present invention may further include the step C of constructing the database storing the records, including the pieces of terminal identification information, access information, and service identification information and the path IDs.

Furthermore, a communication relay method of the present invention may include a step D1 of a communication relay server capable of accessing a database storing records, including pieces of user information, terminal identification information, access information, and service identification information, path IDs, and pieces of communication path setup information, checking terminal identification information and access information, received from a first terminal attempting communication, based on the access information managed by the communication relay server; a step D2 of the communication relay server searching the database for a record including the terminal identification information and the access information checked at step D1; a step D3 of the communication relay server extracting a record, having identical user information to user information corresponding to the record retrieved at step D2, from the database; and a step D4 of the communication relay server checking whether there is a second terminal to which a communication path has been set up based on communication path setup information about the record extracted at step D3, if, as a result of the check, the second terminal to which the communication path has been set up does not exist, performing a communication path setup process for the first terminal, and if as a result of the check, the second terminal to which the communication path has been set up exists, performing the communication path setup process for the first terminal, and blocking the communication path to the second terminal.

Furthermore, a communication relay method of the present invention may include a step E1 of a communication relay server capable of accessing a database storing records, including pieces of user information, terminal identification information, access information, and service identification information, path IDs, and pieces of priority information, receiving service identification information and a path ID from a service providing server attempting communication with the communication relay server; a step E2 of the communication relay server searching the database for a record, including the service identification information and the path ID received at step E1; a step E3 of the communication relay server extracting records, having identical user information to user information corresponding to the record retrieved at step E2, from the database; and a step E4 of the communication relay server selecting terminal identification information included in a record having highest, priority information, from among the records extracted at step E3, and setting up a communication path between the service providing server and a terminal corresponding to the selected terminal identification information, wherein if the setup of the communication path is failed, the communication relay server sets up the communication path by selecting terminal identification information in order of priority information from the records extracted at step E3 until the communication path is set up.

Furthermore, a communication relay method of the present invention may include a step F1 of a communication relay server capable of accessing a database storing records, including pieces of user information, terminal identification information, access information, and service identification information, path IDs, and pieces of priority information, receiving an internal transfer command from a first terminal, when forming a communication path between the first terminal and a service providing server and relaying communication between the first terminal and the service providing server; a step F2 of the communication relay server searching for a record, including terminal identification information and access information used in the communication path between the first terminal and the service providing server and checking user information include in the retrieved record; a step F3 of the communication relay server extracting records having identical user information to the user information checked at step F2; a step F4 of the communication relay server selecting terminal identification information and access information included in a record, having highest priority information, from among the records extracted at step F3; and a step F5 of the communication relay server performing a communication path setup process based, on the terminal identification information and the access information selected at step F4 and then blocking the communication path to the first terminal.

Furthermore, a communication relay method of the present invention may include a step G1 of a communication relay server capable of accessing a database storing records, including pieces of user information, terminal identification information, access information, and service identification information and path IDs, receiving an internal transfer command and information for identifying a second terminal from a first terminal, when forming a communication path between, the first terminal, and a service providing server and relaying communication between the first terminal and the service providing server; a step G2 of the at ion relay server checking terminal identification information and access information used in the communication path to the first terminal; a step G3 of the communication relay server checking terminal identification information of the second terminal based on the information for identifying the second terminal received at step G1; a step G4 of the communication relay server searching for a record, including the terminal identification information and the access information checked at step G2; a step G5 of the communication relay server checking user information included in the record retrieved at step G4; a step G6 of the communication relay server searching for a record including the user information checked at step G5 and the terminal identification information of the second terminal checked at step G3; and a step G7 of the communication relay server performing a communication path setup process between the second terminal and the service providing server based on the terminal identification information and the access information, included in the record retrieved at step G6, and blocking the communication path to the first terminal.

BRIEF DESCRIPTION OF THE DRAWINGS

Further objects and advantages of the invention can be more fully understood from the following detailed description taken in conjunction with the accompanying drawings in which:

FIG. 1 is a block diagram illustrating a communication relay system according to the present invention;

FIG. 2 is a diagram illustrating information transmitted in order to form a communication path in a communication relay system, server, and method according to the present invention; and FIG. 3 is a block diagram illustrating the communication relay server according to the present invention.

DESCRIPTION OF REFERENCE NUMERALS OF PRINCIPAL ELEMENTS IN THE DRAWINGS

| | |
|---|---|
| 100: terminal | 200: communication relay server |
| 300: service providing server | |

DETAILED DESCRIPTION OF EMBODIMENTS

Various embodiments of the present invention will be described in detail with reference to the accompanying drawings. A detailed description of well-known techniques and constructions that may be determined to make obscure the gist of the present invention will be omitted. Furthermore, in describing the present invention with reference to the accompanying drawings, the same reference numbers are used throughout the drawings to refer to the same parts having the same function.

FIG. 1 is a block diagram illustrating a communication relay system according to the present invention.

Referring to FIG. 1, in the communication relay system according to the present invention, terminals 100 communicate with a communication relay server 200 over a specific communication network, and the communication relay server 200 is connected to service providing servers 300 for providing various kinds of service over an Internet network.

The service providing server 300 may correspond to a server for providing any kind of service, such as a messenger server for providing services, such as chat, sending instant messages, and sending messages, a web server for operating web sites, and a content server for storing various kinds of content and providing the content to subscribers.

The communication network between the terminals 100 and the communication relay server 200 may include a variety of communication networks, such as a telephone network and an Internet network, but the communication network between the communication relay server 200 and the service providing servers 300 must be the Internet network. Accordingly, in order to provide the services of the service providing servers 300 to the terminals 100 via the communication relay server 200, there is a need for an application for converting information between the communication relay server 200 and the service providing servers 300 so that the information is suitable for them and for synchronizing and relaying protocols. The module performing the above functions may be loaded on the communication relay server 200.

For example, services provided by the service providing servers 300 may be a short message personal SKS, such as twitter, Internet TV, Internet radio, bio rhythms, daily fortunes, an event quiz, new product release information, bi-directional dialogue robots. Bi-directional communication is performed between the terminals 100 and the communication relay server 200 using a method, such as a telephone or a messenger (i.e., when the terminal 100 is a telephone, the communication relay server 200 looks like a telephone, and when the terminal 100 is a computer device using a messenger, the communication relay server 200 looks like a computer device using a messenger), bi-directional communication is performed between the communication relay server 200 and the service providing servers 300 using the existing various communication methods, such as intra-Internet data communication (e.g., http, sip, and audio/video conference), and the two communication sections are mutually relayed. Accordingly, a path between the terminals 100 and the service providing servers 300 is bi-directionally formed.

FIG. 2 is a diagram illustrating information transmitted in order to form a communication path in a communication relay system, server, and method according to the present invention.

The communication relay server 200 can access a database for storing records, including pieces of terminal identification information, access information, and service identification information, and path IDs. The database may be included in the communication relay server 200 or may exist separately from the communication relay server 200.

A process of forming a communication path is performed as follows.

The terminal 100 attempts communication while transmitting terminal identification information and access information to the communication relay server 200. Here, the terminal identification information refers to identification information for distinguishing the terminals 100 from each other, and the access information refers to various telephone numbers which are allocated to and stored in the communication relay server 200 so that the terminals 100 can attempt communication with the communication relay server 200.

If the terminal 100 attempts communication with the communication relay server 200 over a telephone network using a telephone or a portable phone, the telephone number of the terminal 100 may be used as the terminal identification information, and the telephone number allocated to the communication relay server 200 may be used as the access information.

If the terminal 100 is a communication terminal that forms a communication path over an Internet network using a messenger, a messenger ID may be used as the terminal identification information, and a messenger ID allocated to the communication relay server 200 may be used as the access information.

The process of forming a communication path is described in detail below with reference to Table 1. Table 1 shows pieces of information stored in the database.

TABLE 1

| TERMINAL IDENTIFICATION INFORMATION | ACCESS INFORMATION | SERVICE IDENTIFICATION INFORMATION | PATH ID |
|---|---|---|---|
| 010-1111-2222 | #1111 | AAA | dfla |
| 010-2222-3333 | #1234 | BBB | vxed |
| 010-3333-4444 | #1111 | CCC | oeld |

When the communication relay server 200 receives the terminal identification information and the access information from the terminal 100, the communication relay server 200 searches the database for a record, including the terminal identification information and the access information, and selects the service providing server 300 corresponding to service identification information and a path ID of the retrieved record.

The communication relay server 200 forms a communication path between the terminal 100 and the service providing server 300 by transmitting only the path ID and the service identification information to the selected service providing server 300.

In other words, only the path ID and the service identification information are transmitted to the service providing server 300, but the terminal identification information and the access information are not transmitted to the service providing server 300. Accordingly, the terminal identification information of the terminal 100 is protected. That is, the drain of personal information, such as a telephone number, can be prevented.

Furthermore, since the terminal identification information and the access information are paired and thus service to be used by the terminal 100 is checked, the type of service is not limited, to the number of pieces of access information stored in the communication relay server 200. That, is, as shown in Table 1, if the terminal 100 having terminal identification information of 010-1111-2222 has access information of #1111, service having service identification information of AAA is selected. If the terminal 100 having terminal identification information of 010-3333-4444 has access information of #1111, service having service identification information of CCC is selected. Accordingly, the access information is not dependent on a specific service in a one-to-one manner, but a different service can be selected according to different terminal identification information. Consequently, limited access information resources can be efficiently used.

Consequently, even though there are, for example, 1000 limited access information resources, a communication path is not limited to the number of 1000. If the number of subscribers is ten thousand, a path towards a maximum of ten million different services can be set up.

The above communication path setup process is illustrated to be started by the communication attempt made by the terminal 100, but may be started by a communication attempt made by the service providing server 300. More particularly, when the service providing server 300 attempts communication with the communication relay server 200 by transmitting service identification information and a path ID, the communication relay server 200 searches for a record, including the service identification information and the path ID and selects the terminal 100, corresponding to terminal identification information and access information included in the retrieved record. Accordingly, a communication path is formed between the service providing server 300 that attempted the communication and the selected terminal 100.

In the above description, if the terminal 100 is any one of a telephone, a portable phone, and an Internet phone, the terminal identification information may be the telephone number of the terminal 100, and the access information may be any one of a telephone number and a WING number for attempting communication with the communication relay server 200.

If the terminal 100 is a communication terminal, such as a computer capable of using a messenger, the terminal identification information may be a messenger ID used in the terminal 100, and the access information may be a messenger ID for attempting communication with the communication relay server 200.

FIG. 3 is a block diagram illustrating the communication relay server according to the present invention.

Referring to FIG. 3, the communication relay server 200 according to an aspect of the present invention may include a storage unit 210 for including the database for storing records, including pieces of terminal, identification information, access information, and service identification information, and path IDs; a terminal access unit 220 for accessing the terminals 100; a channel access unit 230 for accessing the service providing servers 300; and a control unit 240 for, when the terminal 100 attempts communication using the terminal identification information and the access information, forming a communication path to the service providing server 300 using the service identification information and the path ID corresponding to the terminal identification information and the access information and, when the service providing server 300 attempts communication using the service identification information and the path ID, forming an access path to the terminal 100 using the terminal identification information and the access information corresponding to the service identification information and the path ID.

Here, the terminal 100 may be of any kind which enables a person to send or receive information, such as a portable phone, a mobile terminal such as a PDA, or a computer terminal for enabling e-mail and a messenger. That is, a network over which the terminal 100 attempts communication with the communication relay server 200 is not limited to a telephone network or an Internet network, but communication may be attempted over other communication networks.

A communication relay method according to a first embodiment of the present invention includes the step A1 of the communication relay server capable of accessing the database storing records, including pieces of terminal identification information, access information, and service identification information, and path IDs, checking terminal identification information and access information, received from a terminal attempting communication, based on the access information managed by the communication relay server; the step A2 of the communication relay server searching for the database for a record including the terminal identification information and the access information checked at step A1; the step A3 of the communication relay server determining a service providing server to which a communication path will be set up based, on the service identification information of the record retrieved at step A2; and the step A4 of the communication relay server setting up the communication path between the terminal and the service providing server by transmitting the service identification information and the path ID, corresponding to the record retrieved at step A2, to the service providing server determined at step A3.

The first embodiment relates to the communication relay method when the terminal 100 first attempts communication. The first embodiment will be described in detail below with reference to an example.

There are a company A operating the communication relay server 200 and a company B operating the service providing servers 300. A person A who owns a personal terminal having a telephone number 010-1111-1111 wants to receive a specific service from the company B, but tries to receive the service through the company A in order to prevent the telephone number from being exposed to the company B. The company A stores records, including 010-1111-1111 (i.e., terminal identification information), 070-1234-1234 (i.e., access information managed by the company A), service1 (i.e., service identification information), and an ID1 (i.e., a path ID), in the database and informs the person A that the access information 070-1234-1234 has been allocated to the person A at the request of the person A. The person A dials the access information 070-1234-1234. Here, the communication relay server 200 of the company A knows that a personal terminal having the personal identification information 010-1111-1111 attempts communication using the access number 070-1234-1234. The communication relay server 200 of the company A searches for record and connects the communication to the service providing servers 300 of the company B based on the service identification information (i.e., service1), but informs the company B of only the path ID (i.e., ID1). The company B is unable to know the terminal identification information of the person A, but can be provided with the specific service through the communication path.

If the record, including the terminal identification information and the access information, does not exist in the database at step A2, the step of transmitting a guidance message, informing an error of the access information and impossible access, to the terminal 100 that attempted, the communication may be further included.

A communication relay method according to a second embodiment of the present invention may include the step B1 of the communication relay server capable of accessing the database storing records, including pieces of terminal identification information, access information, and service identification information, and path IDs, receiving service identification information and a path ID from a service providing server attempting communication with the communication relay server; the step B2 of the communication relay server searching the database for a record, including the service identification information and the path ID received at step B1; the step B3 of the communication relay server determining a terminal to which a communication path will be set up based on the terminal identification information corresponding to the record retrieved at step B2; and the step B4 of the communication relay server setting up the communication path between the service providing server and the terminal by transmitting the terminal identification information and the access information, corresponding to the record retrieved at step B2, to the terminal determined at step B3.

The above second embodiment relates to the communication relay method when the service providing server 300 first attempts communication, and it will be described below with reference to the example described in connection with the first embodiment.

The company B attempts communication with the communication relay server 200 of the company A by using service1 (i.e., service identification information) and ID1 (i.e., a path ID) in order to attempt communication with the person A. The communication relay server 200 of the company A searches for a relevant record and connects the company B and the person A based on 010-1111-1111 (i.e., terminal identification information) as if the communication attempt is made from. 070-1234-1234 (i.e., access information). If the person A requests the company A to delete the record in order not to receive a call from the company B again, the company A deletes the record, so that the company B has no way of accessing the person A.

A communication relay method according to a third embodiment of the present invention may further include the step of constructing the database. Accordingly, the communication relay method according to the third, embodiment of the present, invention further includes the step C of constructing the database storing records, including pieces of terminal identification information, access information, and service identification information, and path IDs. Here, the term construction should be understood as a comprehensive concept, including storing or deleting the records.

If the records are added to the database at step C and the contents of the database are changed, the step C' of transmitting an SMS message, informing a description of an added path, by using access information of newly added record as a calling number and terminal identification information of a terminal as a called number may be further included.

The step C of constructing the database will be described in detail below.

The step C of constructing the database may include the step C1-1 of the communication relay server 200 receiving an SMS message transmitted thereto based on first access information, wherein the SMS message includes a specific keyword for identifying the service providing server 300 to be selected and terminal identification information; and the step C1-2 of the communication relay server 200 adding a record to the database, wherein the added record, includes the terminal identification information received at step C1-1, second access information not yet allocated to the terminal identification information from among pieces of access information on which communication with the communication relay server can be made, service identification information corresponding to the keyword for identifying the service providing server, and a path ID not yet allocated to the service identification information as one record.

Here, the first access information is access information specially defined by the communication relay server 200 and may be a telephone number which is directly used in an advertisement or public relations. For example, assuming that public relations was announced by using a telephone number 070-700-0000 as the first access information, when the terminal 100 having a telephone number 010-1234-1234 sends an SMS message including "service1" using the telephone number 070-700-0000, the communication relay server 200 sets up a path to the service providing server 300 related to "service1", but sets up the path based on the second access information not yet allocated to the terminal 100 having terminal identification information corresponding to the telephone number 010-1234-1234. That is, to define the first identification information, such as 070-700-0000, helps in terms of public relations and management.

The step C of constructing the database may be described in detail below in a different way.

That is, the step C of constructing the database may includes the step C2-1 of the communication relay server 200 receiving an SMS message transmitted thereto based on access information, wherein the SMS message includes a keyword capable of identifying specific operation information and terminal identification information; and the step C2-1 of the communication relay server 200 processing a record, including the terminal identification information, the access information, and the terminal identification information, and service identification information and a path ID corresponding to the access information, by using an operation corresponding to the specific operation information and managing a result of the operation in the database.

That is, not only the operation for adding a record to the database, but also various operations can be selectively processed by including operation information in an SMS message.

According to a fourth embodiment of the communication relay method of the present invention, a method of changing a terminal during communication by using user information and communication path setup information may be implemented.

More particularly, the communication relay method according to the fourth embodiment of the present invention includes the step D1 of the communication relay server capable of accessing the database storing records, including pieces of user information, terminal identification information, access information, and service identification information, path IDs, and pieces of communication path setup information, checking terminal identification information and access information, received from a first terminal attempting communication, based on the access information managed by the communication relay server; the step D2 of the communication relay server searching the database for a record including the terminal identification information and the access information checked at step D1; the step D3 of the communication relay server extracting a record, having the same user information as user information corresponding to the record retrieved at step D2, from the database; and the step D4 of the communication relay server checking whether there is a second terminal to which a communication path has been set up based on communication path setup information about the record extracted at step D3, if, as a result of the check, the second terminal to which the communication path has been set up does not exist, performing a communication path setup process for the first terminal, and if, as a result of the check, the second terminal to which the communication path has been set up exists, performing the communication path setup process for the first terminal and blocking the communication path to the second terminal.

A process of changing a communication path is described in detail below with reference to Table 2. Table 2 shows pieces of information stored in the database.

TABLE 2

| USER INFOR- MATION | TERMINAL ID INFOR- MATION | ACCESS INFOR- MATION | SERVICE ID INFOR- MATION | PATH ID | COMMU- NICATION PATH SETUP INFOR- MATION |
|---|---|---|---|---|---|
| User1 | 010-1111-2222 | #1111 | AAA | dfla | True |
| User1 | Messenger1 | M_ID1 | AAA | qwer | False |
| User2 | 010-2222-3333 | #1111 | BBB | vxed | False |
| User3 | 010-3333-4444 | #2222 | CCC | oeld | True |

For example, a User1 is setting up a communication path to the service providing server 300, having service identification information AAA, via the communication relay server 200 based on access information #1111 by using the first terminal 100 which uses a telephone number 010-1111-2222 as terminal identification information. Accordingly, communication path setup information is stored as True.

In this case, at step D1, the User1 attempts communication with access information M_ID1 by using an ID 'Messenger1' by using the second terminal 100. At step D2, the communication relay server 200 searches for a record, including Messenger1 and M_ID1 as terminal identification information and access information, respectively. A record in the second row is searched for, and user information at this time is checked. The user information shows User1. Next, at step D3, the communication relay server 200 extracts all records having the user information of User1. At step D4, the communication relay server 200 checks whether there is a record in which communication path setup information is True, from among the extracted records. In Table 2, the record in the first row corresponds to the record in which the communication path setup information is True. In this case, while a new communication path using the terminal identification information Messenger1 and the access information M_ID1 is formed, the existing communication path of the record in the first, row is blocked. The communication path setup information may have only to be changed to True or False according to circumstances. If a communication path has not been set up, the process of blocking the communication path is not performed.

According to a fifth embodiment of the communication relay method of the present invention, a method of the service providing servers 300 attempting communication according to priority of the terminals 100 for every user when attempting the communication with the terminals 100 may be implemented.

More particularly, the communication relay method according to the fifth embodiment of the present invention includes the step E1 of the communication relay server capable of accessing the database storing records, including pieces of user information, terminal identification information, access information, and service identification information, path IDs, and pieces of priority information, receiving service identification information and a path ID from a service providing server attempting communication with the communication relay server; the step E2 of the communication relay server searching the database for a record, including the service identification information and the path ID received at step E1; the step E3 of the communication relay server extracting records, having the same user information as user information corresponding to the record retrieved at step E2, from, the database; and the step E4 of the communication relay server selecting terminal identification information included in a record, having the highest priority information, from among the records extracted at step E3 and setting up a communication path between the service providing server and a terminal corresponding to the selected terminal identification information, wherein if the setup of the communication path is failed, the communication relay server sets up the communication path by selecting terminal identification information in order of priority information from the records extracted at step E3 until the communication path is set up.

The fifth embodiment is described in detail below with reference to Table 3. Table 3 shows pieces of information stored in the database.

TABLE 3

| USER INFORMATION | TERMINAL ID INFORMATION | ACCESS INFORMATION | SERVICE ID INFORMATION | PATH ID | PRIORITY INFORMATION |
|---|---|---|---|---|---|
| User1 | 010-1111-2222 | #1111 | AAA | dfla | 1 |
| User1 | Messenger1 | M_ID1 | AAA | qwer | 2 |
| User2 | 010-2222-3333 | #1111 | BBB | vxed | 1 |
| User3 | 010-3333-4444 | #2222 | CCC | oeld | 1 |

The service providing server 300 having service identification information AAA attempts communication with the terminal 100 having a path ID 'qwer'. At step E1, the communication relay server 200 receives AAA and qwer and then searches for a record, including AAA and qwer, at step E2, so that the record in the second row is searched for. At step E3, the communication relay server 200 checks that user information included in the record checked at step E2 is User1 and extracts all records having the user information of User1. Here, the records in the first and second rows are extracted. At step E4, the record in the first row, having the highest priority information, from among the records, is selected. Furthermore, the priority has been selected in ascending powers of priority information, but may be selected in descending powers or in other ways. The communication relay server 200 attempts communication with the terminal 100 based, on the terminal identification information 010-1111-2222 and the access information #1111 in the record of the first row. If the setup of a communication path is failed, the communication relay server 200 attempts communication by using the record in the second row, having the second highest priority information.

When communication is relayed based on priority information as described above, there is an advantage in that a user can previously select the terminal 100 that is available during his absence by previously setting the priority information.

According to a sixth embodiment of the communication relay method of the present invention, a method of a user of one terminal 100 changing a communication path to the other terminal 100 in the state in which the communication relay server 200 is relaying communication may be implemented. Here, the other terminal 100 is sequentially determined based on preset priority information.

More particularly, the communication relay method according to the sixth embodiment of the present invention includes the step F1 of the communication relay server capable of accessing the database storing records, including pieces of user information, terminal identification information, access information, and service identification information, path IDs, and pieces of priority information, receiving an internal transfer command from a first terminal, when forming a communication path between the first terminal and a service providing server and relaying communication between the first terminal and the service providing server; the step F2 of the communication relay server searching for a record, including terminal identification information and access information used in the communication path between the first terminal and the service providing server and checking user information included in the retrieved record; the step F3 of the communication relay server extracting records having the same user information as the user information checked at step F2; the step F4 of the communication relay server selecting terminal identification information and access information included in a record having the highest priority information, from among the records extracted at step F3; and the step F5 of the communication relay server performing a communication path setup process based on the terminal identification information and the access information selected at step F4 and then blocking the communication path to the first terminal.

The sixth embodiment is described in detail below with reference to Table 3.

There is set up a communication path to a user, having user information of User1, through access information M_ID1 based on terminal identification information of Messenger1. At step F1, the user transfers an internal transfer command to the communication relay server 200 by using the terminal 100. The internal transfer command may be generated by clicking a specific button provided in a messenger program or may be generated by pressing a specific button, such as '*' or '#', in a telephone such as a portable phone. At step F2, the communication relay server 200 searches for records, including the terminal identification information and the access information, which are being used in the communication path. In other words, the communication relay server 200 searches for records including Messenger1 and M_ID1. The record in the second row is searched for in Table 3, and user information included in this record is checked to User1. At step F3, the communication relay server 200 extracts the records in the first and second rows by extracting the records having the user information of User1. At step F4, the communication relay server 200 selects a record having the highest priority information, from among the extracted records. In Table 3, the record of the first row is selected. At step F5, the communication relay server 200 newly sets up a communication path based on the terminal identification information 010-1111-2222 and the access information #1111 included in the selected record and blocks the existing communication path to the terminal 100. Accordingly, the terminal 100 can be changed.

According to a seventh embodiment of the communication relay method of the present invention, a method of a user of one terminal 100 changing a communication path to the other terminal 100 in the state in which the communication relay server 200 is relaying communication may be implemented. Here, the user can select the other terminal 100 by transmitting specific information for identifying the other terminal 100 to the communication relay server 200 through the terminal 100.

More particularly, the communication relay method according to the seventh embodiment of the present invention includes the step G1 of the communication relay server capable of accessing the database storing records, including pieces of user information, terminal identification information, access information, and service identification information and path IDs, receiving an internal transfer command and information for identifying a second terminal from a first terminal, when forming a communication path between the first terminal and a service providing server and relaying communication between the first terminal and the service providing server; the step G2 of the communication relay server checking terminal identification information and access information used, in the communication path to the first terminal; the step G3 of the communication relay server checking terminal identification information of the second terminal based on the information for identifying the second terminal received at step G1; the step G4 of the communication relay server searching for a record, including the terminal identification information and the access information checked at step G2; the step G5 of the communication relay server checking user information included in the record retrieved, at step G4; the step G6 of the communication relay server searching for a record including the user information checked at step G5 and the terminal identification information of the second terminal checked at step G3; and the step G7 of the communication relay server performing a communication path setup process between the second terminal and the service providing server based on the terminal identification information and the access information, included in the record retrieved at step G6, and blocking the communication path to the first, terminal.

The seventh embodiment is described in detail below with reference to Table 4. Table 4 shows pieces of information stored in the database.

TABLE 4

| USER INFOR- MATION | TERMINALS ID INFOR- MATION | ACCESS INFOR- MATION | SERVICE ID INFOR- MATION | PATH ID |
|---|---|---|---|---|
| User1 | 010-1111-2222 | #1111 | AAA | dfla |
| User1 | Messenger1 | M_ID1 | AAA | qwer |
| User2 | 010-2222-3333 | #1111 | BBB | vxed |
| User3 | 010-3333-4444 | #2222 | CCC | oeld |

It is assumed that a user (i.e., user information User1) sets up a communication path using terminal identification information Messenger1 and access information M_ID1. The user tries to newly set up the communication path by using his portable phone having a telephone number of 010-1111-2222. At step G1, the user transmits an internal transfer command and specific information for identifying the terminal 100 to which the communication path will be newly set up to the communication relay server 200 by using the terminal 100. At step G2, the communication relay server 200 checks terminal identification information and access information about the terminal 100 which is performing communication through the set up communication path. That is, the communication relay server 200 checks the terminal identification information Messenger1 and the access information M_ID1. Furthermore, at step G3, the communication relay server 200 checks the terminal identification information of the terminal 100 to which a communication path will be newly set up based on the information received from the terminal 100. Here, the telephone number 010-1111-2222 is checked. At step G4, the communication relay server 200 searches for a record, including the terminal identification information Messenger1 and the access information M_ID1 at step G2, and thus the record of the second row is searched for. At step G5, User1 which is the user information included in the record retrieved at step G4 is checked. Next, at step G6, the communication relay server 200 searches for a record, including the user information User1 checked at step G5 and the terminal identification information 010-1111-2222 checked at step G3. Here, the record of the first row is searched for. Next, at step G6, the communication relay server 200 sets up a new communication path based on the terminal identification information 010-1111-2222 and access information #1111 included in the retrieved record and blocks the existing communication path.

In accordance with the; communication relay system, server, and method constructed as described above according to the present invention, there is an advantage in that security can be improved because terminal identification information of a terminal is not exposed when the terminal accesses a service providing server. For example, when the terminal accesses the service providing server through the communication relay server and uses service, such as chat, sending an instant message, or sending a message, the terminal identification information of the terminal is provided to the communication relay server, but the communication relay server does not provide the terminal identification information to the service providing server. Accordingly, security can be improved.

Furthermore, there is an advantage in that more various kinds of services than the number of pieces of access information provided by the communication relay server are provided, but services as many as the number of pieces of access information provided by the communication relay servers can be selectively provided to each terminal.

Furthermore, there is an advantage in that user convenience can be increased because a communication relay path can be changed to the other terminal during communication relay through the communication relay server between one terminal and the service providing server.

The preferred embodiments of the present invention have been described above with reference to the accompanying drawings. The terms or words used in the specification and the claims should not be construed as having typical or dictionary meanings, but should be construed as having meanings and concepts which coincide with the technical spirit of the present invention.

Accordingly, the constructions shown in the embodiments and drawings of the specification illustrate only the most preferred embodiments of the present invention and do not represent the entire technical spirit of the present invention. Accordingly, it should be understood that a variety of equivalent arrangements and modifications which may replace the constructions may exist at the time of filing of this application.

What is claimed is:

1. A communication relay system, comprising:

at least one terminal for attempting communication over a communication network using access information and transmitting terminal identification information together with the access information;

at least one service providing server for providing service through a communication path set up over an Internet network; and a communication relay server for setting up the communication path between the terminal and the service providing server, wherein the communication relay server accesses a database storing records, including pieces of user information, terminal identification information, access information, and service identification information and path IDs, pieces of either communication path setup information and checks the terminal identification information and the access information being received from a first terminal attempting communication based on the access information managed by the communication relay server, wherein the communication relay server searches the database for a record including the terminal identification information and the access information, and wherein the communication relay server extracts a record, having identical user information to user information corresponding the record retrieved from the database; and wherein the communication relay server checks whether there is a second terminal to which a communication path has been set up based on communication path setup information about the record extracted, if as a result of the check, the second terminal to which the communication path has been set up does not exist, performing a communication path setup process for the first terminal, and if, as a result of the check, the second terminal to which the communication path has been set up exists, performing the communication path setup process for the first terminal, and blocking the communication path to the second terminal.

2. The communication relay system as claimed in claim 1, wherein when the service providing server attempts communication while transmitting the service identification information and the path ID to the communication relay server, the communication relay server searches for a record including the service identification information and the path ID, selects a terminal corresponding to the terminal identification information and the access information included in the retrieved record, and sets up a communication path between the selected terminal and the service providing server attempting communication.

3. The communication relay system as claimed in claim 1, wherein:

the terminal is any one of a telephone, a portable phone, and an Internet phone, the terminal identification information is a telephone number of the terminal, and the access information is a telephone number and a WINC number for attempting the communication with the communication relay server.

4. The communication relay system as claimed in claim 1, wherein:

the terminal is a communication terminal capable of using a messenger, the terminal identification information is a messenger ID used in the terminal, and the access information is a messenger ID for attempting the communication with the communication relay server.

5. A communication relay server, comprising:

a storage unit for including a database, storing records including pieces of terminal identification information, access information, and service identification information and path ID;

a terminal access unit for accessing a terminal;

a channel access unit for accessing a service providing server; and a control unit accessing a database storing records, including pieces of user information, terminal identification information, access information, and service identification information, path IDs, and pieces of communication path setup information or priority information, the control unit searching for a record, including the terminal identification information, the access information used in a communication path between the terminal and the service providing server by checking the user information included in the searched records, the control unit extracting the records having identical user information to the user information to determine which path is to be made active based on either the terminal that transmitted a request or a priority of various entries associated with the user information or a specified terminal.

6. A communication relay method, comprising:

a step A1 of a communication relay server capable of accessing a database storing records, including pieces of terminal identification information, access information, and service identification information, and path IDs, checking terminal identification information and access information, received from a terminal attempting communication, based on the access information managed by the communication relay server;

a step A2 of the communication relay server searching for the database for a record including the terminal identification information and the access information checked at step A1;

a step A3 of the communication relay server determining a service providing server to which a communication path will be set up based on the service identification information of the record retrieved at step A2;

a step A4 of the communication relay server setting up the communication path between the terminal and the service providing server by transmitting the service identification information and the path ID, corresponding to the record retrieved at step A2, to the service providing server determined at step A3;

a step A5 communication relay server constructing the database storing the records, including the pieces of terminal identification information, access information, and service identification and the path IDs. Wherein the step A5 of constructing the database comprises;

a step C1-1 of the communication relay service receiving an SMS message transmitted thereto based on first access information, wherein the SMS message includes a specific keyword for identifying the service providing server to be selected and terminal identification information; and a step C1-2 of the communication relay server adding a record to the database, wherein the added record includes the terminal identification information received at step C1-1 second access information not yet allocated to the terminal identification information from among the pieces of access information on which communication with the communication relay server is performed, service identification information and a step A6 of the communication relay server, when a record is newly added to the database at step A5 and contents of the database are changed, transmitting an SMS message, informing a description of an added path, by using access information about the newly added record as a calling number and terminal identification information about a terminal as a called number, corresponding to the keyword for identifying the service providing server, and a path ID not yet allocated to the service identification information as one record.

7. The communication relay method as claimed in claim 6, wherein the step B5 of constructing the database further comprises:
   a step C2-1 of the communication relay server receiving an SMS message transmitted thereto based on access information, wherein the SMS message includes a keyword capable of identifying specific operation information and terminal identification information; and
   a step C2-1 of the communication relay server processing a record, including the terminal identification information, the access information, and the terminal identification information, and service identification information and a path ID corresponding to the access information, by using an operation corresponding to the specific operation information and managing a result of the operation in the database.

8. The communication relay method as claimed in claim 6, further comprising the step of, if a record including the terminal identification information and the access information does not exist in the database at step A2, transmitting a guidance message, informing an error of the access information and impossible access, to the terminal attempting communication.

9. A communication relay method, comprising:
   a step B1 of a communication relay server capable of accessing a database storing records, including pieces of terminal identification information, access information, and service identification information, and path IDs, receiving service identification information and a path ID from a service providing server attempting communication with the communication relay server;
   a step B2 of the communication relay server searching the database for a record, including the service identification information and the path ID received at step B1;
   a step B3 of the communication relay server determining a terminal to which a communication path will be set up based on the terminal identification information corresponding to the record retrieved at step B2;
   a step B4 of the communication relay server setting up the communication path between the service providing server and the terminal by transmitting the terminal identification information and the access information, corresponding to the record retrieved at step B2, to the terminal determined at step B3;
   a step B5 of the communication relay server constructing the database storing the records, including the pieces of terminal identification information, access information, and service identification and the path IDs, wherein the step B5 of constructing the database further comprises:
   a step C1-1 of the communication relay server receiving an SMS message transmitted thereto based on first access information, wherein the SMS message includes a specific keyword for identifying the service providing server to be selected and terminal identification information; and
   a step C1-2 of the communication relay server adding a record to the database, wherein the added record includes the terminal identification information received at step C1-1 second access information not yet allocated to the terminal identification information from among the pieces of access information on which communication with the communication relay server is performed, service identification information corresponding to the keyword for identifying the service providing server, and a path ID not yet allocated to the service identification information as one record; and
   step B6 of the communication relay server, when a record is newly added to the database at step B5 and contents of the database are changed, transmitting an SMS message, informing a description of an added path, by using access information about the newly added record as a calling number and terminal identification information about a terminal as a called number.

10. A communication relay method, comprising:
    a step D1 of a communication relay server capable of accessing a database storing records, including pieces of user information, terminal identification information, access information, and service identification information, path IDs, and pieces of communication path setup information, checking terminal identification information and access information, received from a first terminal attempting communication, based on the access information managed by the communication relay server;
    a step D2 of the communication relay server searching the database for a record including the terminal identification information and the access information checked at step D1;
    a step D3 of the communication relay server extracting a record, having identical user information to user information corresponding to the record retrieved at step D2, from the database; and
    a step D4 of the communication relay server checking whether there is a second terminal to which a communication path has been set up based on communication path setup information about the record extracted at step D3, if, as a result of the check, the second terminal to which the communication path has been set up does not exist, performing a communication path setup process for the first terminal, and if, as a result of the check, the second terminal to which the communication path has been set up exists, performing the communication path setup process for the first terminal, and blocking the communication path to the second terminal.

11. A communication relay method, comprising:
    a step E1 of a communication relay server capable of accessing a database storing records, including pieces of user information, terminal identification information, access information, and service identification information, path IDs, and pieces of priority information, receiving service identification information and a path ID from a service providing server attempting communication with the communication relay server;
    a step E2 of the communication relay server searching the database for a record, including the service identification information and the path ID received at step E1;
    a step E3 of the communication relay server extracting records, having identical user information to user information corresponding to the record retrieved at step E2, from the database; and
    a step E4 of the communication relay server selecting terminal identification information included in a record having highest priority information, from among the records extracted at step E3, and setting up a communication path between the service providing server and a terminal corresponding to the selected terminal identification information, wherein if the setup of the communication path is failed, the communication relay server sets up the communication path by selecting terminal identification information in order of priority information from the records extracted at step E3 until the communication path is set up.

12. A communication relay method, comprising:
a step F1 of a communication relay server capable of accessing a database storing records, including pieces of user information, terminal identification information, access information, and service identification information, path IDs, and pieces of priority information, receiving an internal transfer command from a first terminal, when forming a communication path between the first terminal and a service providing server and relaying communication between the first terminal and the service providing server;
a step F2 of the communication relay server searching for a record, including terminal identification information and access information used in the communication path between the first terminal and the service providing server and checking user information included in the retrieved record;
a step F3 of the communication relay server extracting records having identical user information to the user information checked at step F2;
a step F4 of the communication relay server selecting terminal identification information and access information included in a record, having highest priority information, from among the records extracted at step F3; and
a step F5 of the communication relay server performing a communication path setup process based on the terminal identification information and the access information selected at step F4 and then blocking the communication path to the first terminal.

13. A communication relay method, comprising:
a step G1 of a communication relay server capable of accessing a database storing records, including pieces of user information, terminal identification information, access information, and service identification information and path IDs, receiving an internal transfer command and information for identifying a second terminal from a first terminal, when forming a communication path between the first terminal and a service providing server and relaying communication between the first terminal and the service providing server;
a step G2 of the communication relay server checking terminal identification information and access information used in the communication path to the first terminal;
a step G3 of the communication relay server checking terminal identification information of the second terminal based on the information for identifying the second terminal received at step G1;
a step G4 of the communication relay server searching for a record, including the terminal identification information and the access information checked at step G2;
a step G5 of the communication relay server checking user information included in the record retrieved at step G4;
a step G6 of the communication relay server searching for a record including the user information checked at step G5 and the terminal identification information of the second terminal checked at step G3; and
a step G7 of the communication relay server performing a communication path setup process between the second terminal and the service providing server based on the terminal identification information and the access information, included in the record retrieved at step G6, and blocking the communication path to the first terminal.

* * * * *